United States Patent
Anderson et al.

(10) Patent No.: US 11,563,771 B2
(45) Date of Patent: Jan. 24, 2023

(54) NETWORK TELEMETRY COLLECTION WITH PACKET METADATA FILTERING

(71) Applicant: Cisco Technology, Inc., San Jose, CA (US)

(72) Inventors: Blake Harrell Anderson, Chapel Hill, NC (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 467 days.

(21) Appl. No.: 16/693,885

(22) Filed: Nov. 25, 2019

(65) Prior Publication Data

US 2021/0160275 A1    May 27, 2021

(51) Int. Cl.
| | | |
|---|---|---|
| H04L 9/40 | (2022.01) | |
| G06N 20/00 | (2019.01) | |
| G06N 5/04 | (2006.01) | |

(52) U.S. Cl.
CPC ........... *H04L 63/1458* (2013.01); *G06N 5/04* (2013.01); *G06N 20/00* (2019.01); *H04L 63/0428* (2013.01)

(58) Field of Classification Search
CPC .................................................. H04L 63/1458
See application file for complete search history.

(56) References Cited

U.S. PATENT DOCUMENTS

| | | | |
|---|---|---|---|
| 10,230,599 B2 | 3/2019 | Pietrowicz et al. | |
| 10,237,068 B2 | 3/2019 | Dara et al. | |
| 10,341,748 B2 | 7/2019 | Anand et al. | |
| 10,362,373 B2 | 7/2019 | Anderson et al. | |
| 2010/0050256 A1* | 2/2010 | Knapp | H04L 69/16 370/252 |
| 2015/0372910 A1* | 12/2015 | Janakiraman | H04L 45/74 370/392 |
| 2016/0191545 A1* | 6/2016 | Nanda | H04L 43/062 726/1 |
| 2019/0158997 A1* | 5/2019 | Starsinic | H04L 12/14 |
| 2019/0349403 A1 | 11/2019 | Anderson | |
| 2020/0296007 A1* | 9/2020 | Finn, II | H04L 43/045 |

(Continued)

FOREIGN PATENT DOCUMENTS

| | | |
|---|---|---|
| CN | 110113349 A | 8/2019 |
| EP | 3382360 A2 | 10/2018 |

OTHER PUBLICATIONS

European Search Report dated Apr. 9, 2021 in connection with European Patent Application No. 20208474.

(Continued)

*Primary Examiner* — Simon P Kanaan
(74) *Attorney, Agent, or Firm* — Behmke Innovation Group LLC; Kenneth J. Heywood; Jonathon P. Western

(57) ABSTRACT

In one embodiment, a telemetry exporter in a network establishes a tunnel between the telemetry exporter and a traffic analysis service. The telemetry exporter obtains packet copies of a plurality of packets sent between devices via the network. The telemetry exporter forms a set of traffic telemetry data by discarding at least a portion of one or more of the packet copies, based on a filter policy. The telemetry exporter applies compression to the formed set of traffic telemetry data. The telemetry exporter sends, via the tunnel, the compressed set of traffic telemetry data to the traffic analysis service for analysis.

18 Claims, 8 Drawing Sheets

(56) References Cited

U.S. PATENT DOCUMENTS

2020/0389371 A1* 12/2020 Tedaldi .................. H04L 45/64

OTHER PUBLICATIONS

Yaacoubi, Omar, "The Rise of Encrypted Malware"; Network Security vol. 2019, No. 5, May 1, 2019, ISSN: 1353-4858; pp. 6-9.
Schoinianakis, Dimitrios, et al, "MDiET: Malware Detection in Encrypted Traffic"; HCI 2014, Sand, Sea and Sky—Holiday HCI; Sep. 10, 2019, ISSN: 1477-9358; pp. 31-37.
Oliver Michel, "Packet-Level Network Telemetry and Analytics", eric-keller.github.io, University of Colorado, Department of Computer Science, 2019, 133 pages.

* cited by examiner

NETWORK TELEMETRY COLLECTION WITH PACKET METADATA FILTERING

TECHNICAL FIELD

The present disclosure relates generally to computer networks, and, more particularly, to network telemetry collection with packet metadata filtering.

BACKGROUND

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

With the proliferation of advanced machine learning techniques, it is now possible to discern the contents of encrypted network traffic, or its intent (e.g., by distinguishing between malware-related traffic and benign traffic), without actually decrypting the traffic. However, doing so still requires the collection of sufficient telemetry from the network regarding the encrypted traffic. This telemetry collection is often non-trivial and can, in some cases, actually impede on the operations of the network due to the additional overhead. Notably, capturing and reporting copies of the encrypted packets for analysis means that the network now has to transmit two copies of the same packet and consuming potentially double the resources that would normally be consumed. While it may be possible to simply disable the encrypted traffic analysis during times of high resource consumption in the network, doing so could also create a network security hole that could be exploited.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
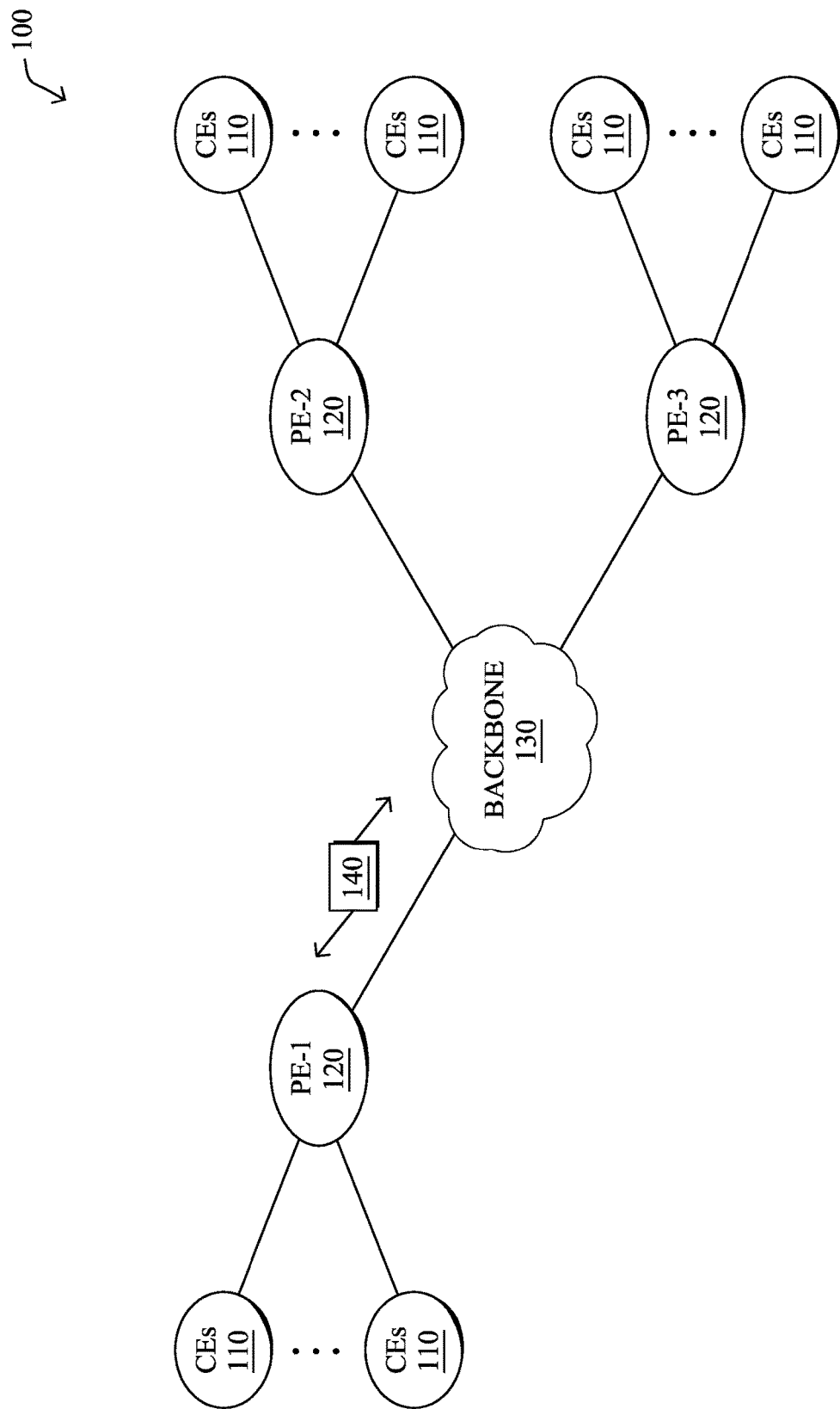
FIGS. 1A-1B illustrate an example communication network.

According to one or more embodiments of the disclosure, a telemetry exporter in a network establishes a tunnel between the telemetry exporter and a traffic analysis service. The telemetry exporter obtains packet copies of a plurality of packets sent between devices via the network. The telemetry exporter forms a set of traffic telemetry data by discarding at least a portion of one or more of the packet copies, based on a filter policy. The telemetry exporter applies compression to the formed set of traffic telemetry data. The telemetry exporter sends, via the tunnel, the compressed set of traffic telemetry data to the traffic analysis service for analysis.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
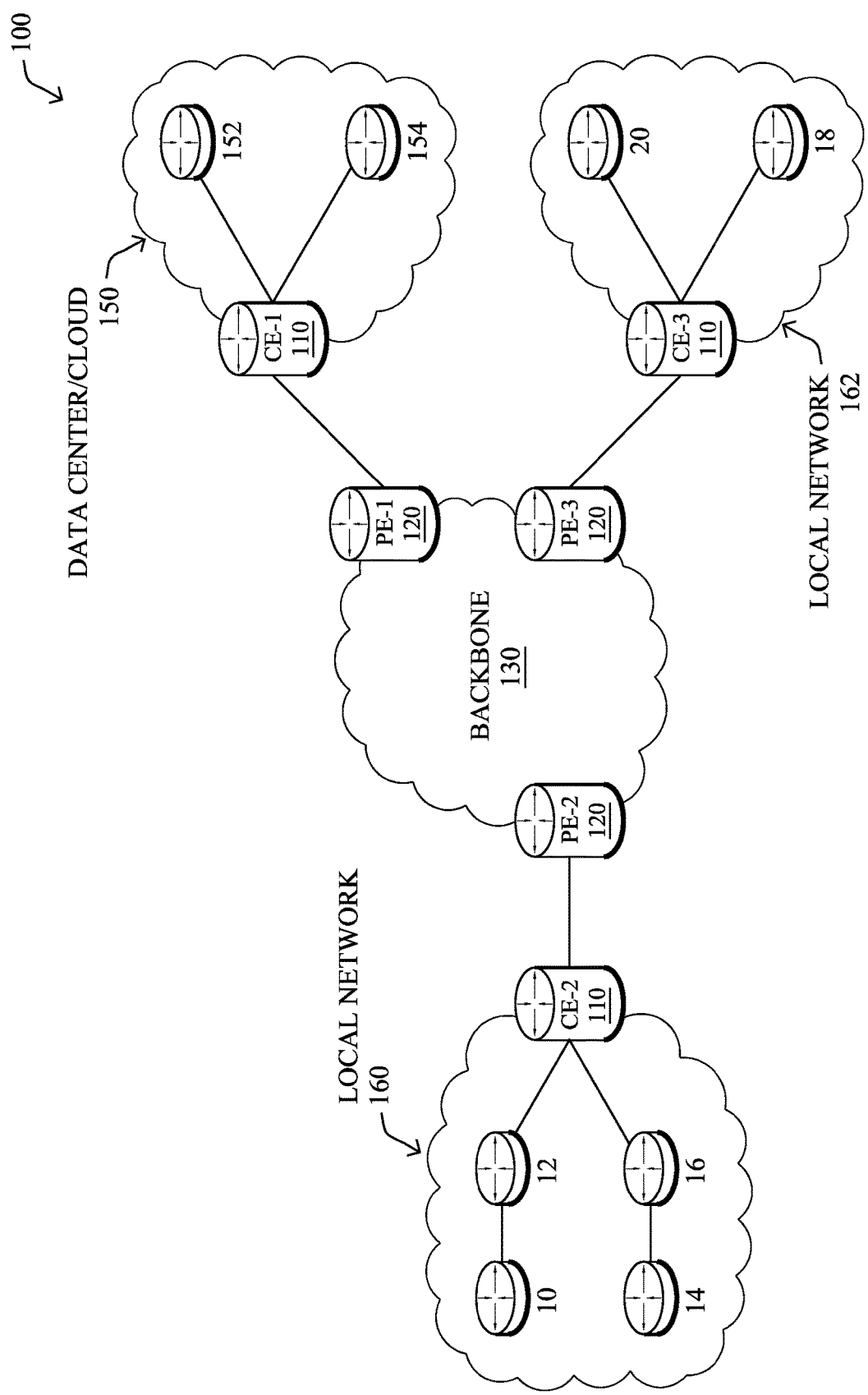

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
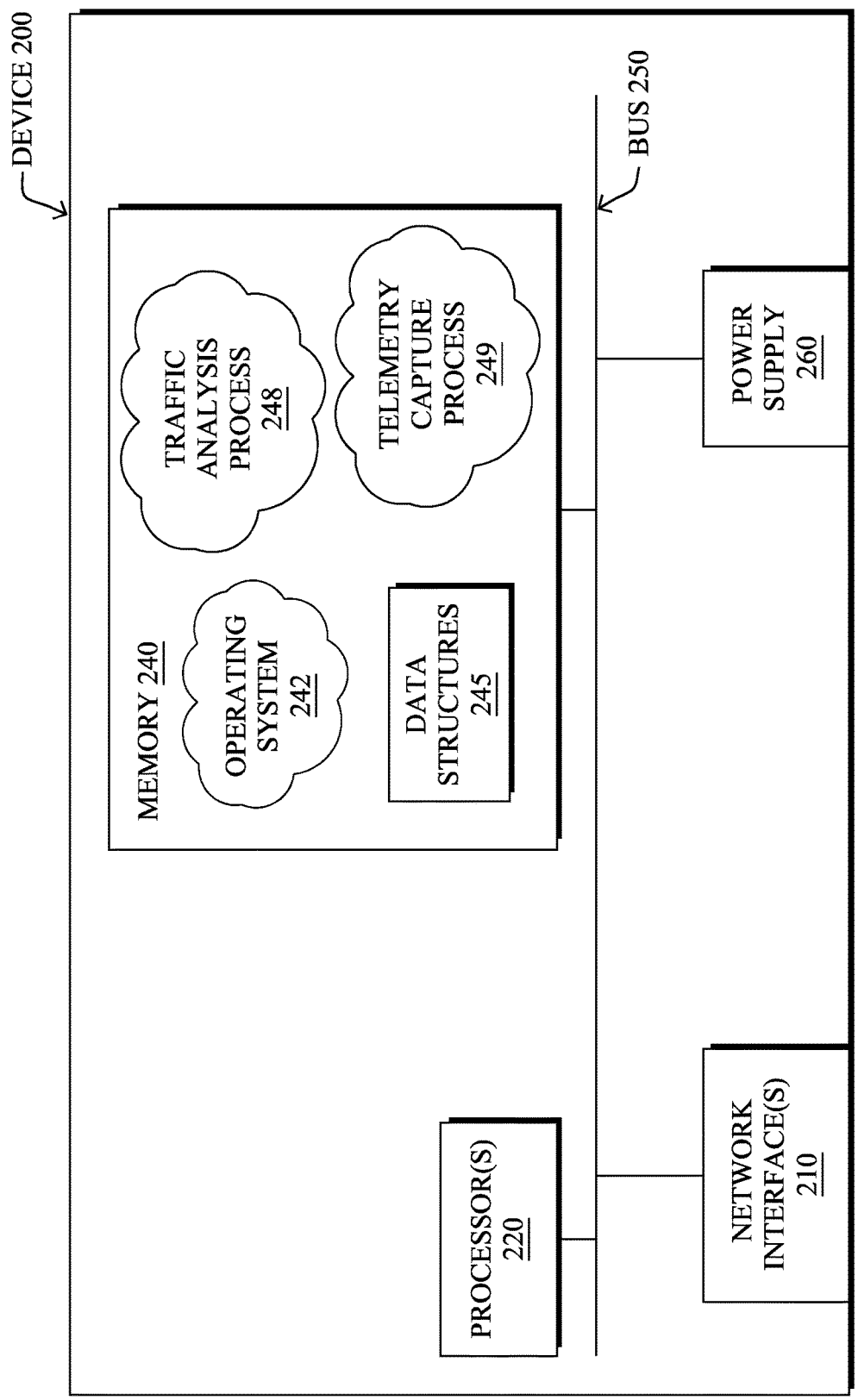
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248 and/or a telemetry capture process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data (e.g., captured by telemetry capture process 249) regarding one or more traffic flows, to determine whether a given traffic flow or set of flows are associated with malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), protocol or application identification, passive operating system fingerprinting, or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data for encrypted traffic that has been labeled as "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, convolutional neural networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-associated, anomalous, etc. Conversely, the false negatives of the model may refer to the number of traffic flows that the model incorrectly classifies as normal, when actually malware-associated, anomalous, etc. True negatives and positives may refer to the number of traffic flows that the model correctly classifies as normal or malware-associated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
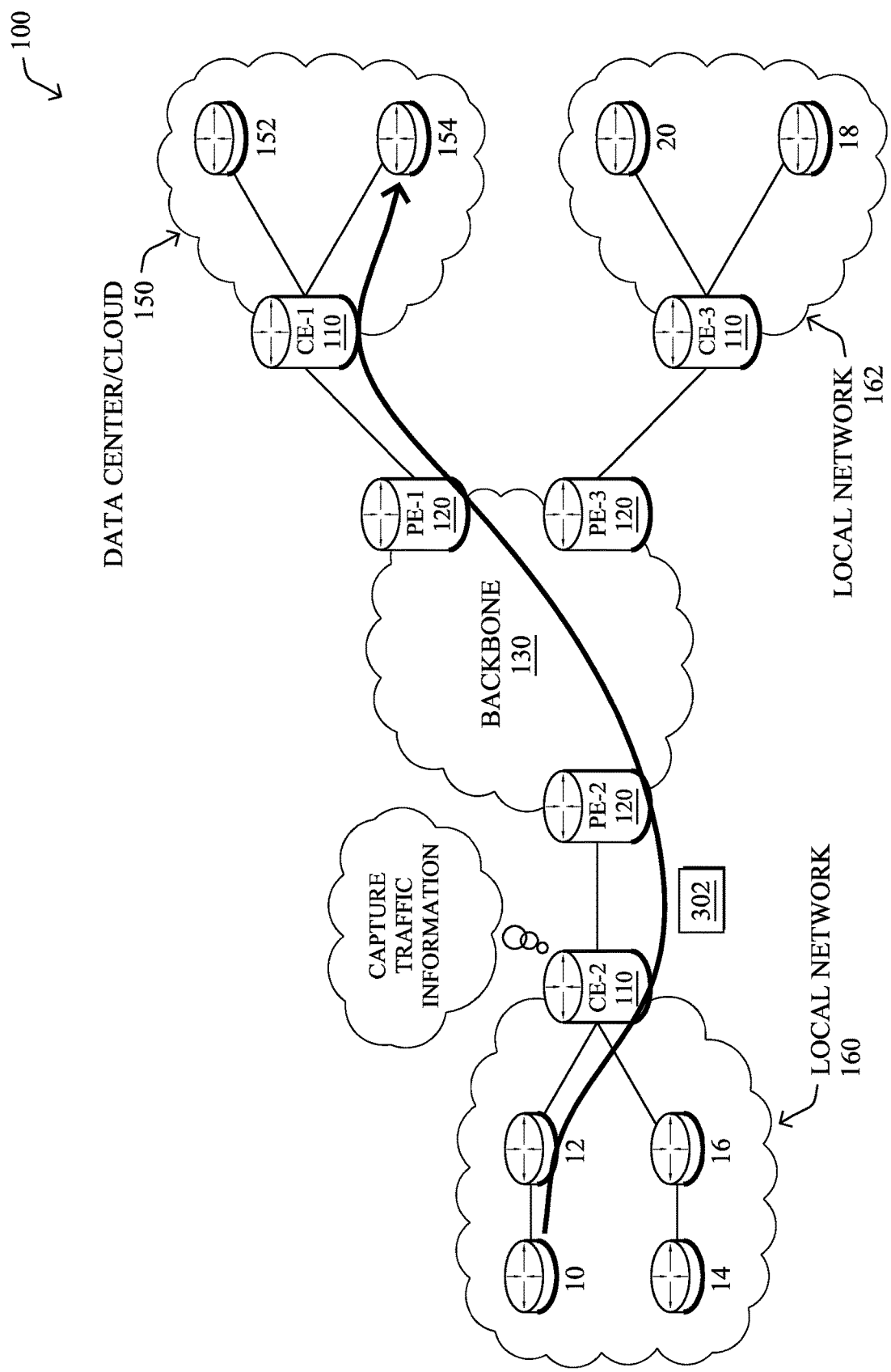
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow (e.g., by execution of telemetry capture process 249). For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, a traffic analysis service that analyzes encrypted traffic may collect intra-flow metadata, such as the TLS feature(s), SPLT information, and the like. In some cases, the service may also capture the initial data packet from the communication, to gain insight into the security strength of the communication transport, detect the presence of malware, and/or identify attempted data exfiltration in the encrypted traffic to command and control sites.

Each flow may be identified by the traffic analysis service by its key fields, such as: source IP, destination IP, source port, destination port, and/or protocol identifier (e.g., identified by its corresponding 5-tuple). Using this identification, captured traffic records may be sent to a flow collector associated with the analysis service under any or all of the following conditions: the connection is completed (e.g., a TCP FIN is encountered), an inactivity timer expired, the flow expired, or the flow cache expired. Typically, as noted, the initial data packet and SPLT information from the first ten packets in the flow are also captured and used as non-key fields to identify the flow.

As would be appreciated, the encrypted traffic analysis service introduced herein may gather and send a large volume of data. For example, a web browser will typically open at least one connection per tab, each with a different source port. Rendering a single web page also uses multiple connections, not all of which are to the same remote address, and none of them sharing the same source port. As any unique combination of the 5-tuple fields in the flow would produce a new flow, a typical web browsing activity generates a large number of flows to process at the telemetry collector.

As noted above, the collection of telemetry data regarding encrypted traffic creates additional overhead on the network. This is particularly true in the case in which a telemetry exporter simply captures copies of the encrypted packets and exports the packets for analysis. For example, this is typically done for the initial n-number of data packets of a flow (e.g., the first ten packets), which include valuable information for purposes of classifying the encrypted traffic.

Network Telemetry Collection with Packet Metadata Filtering

The techniques herein introduce a telemetry collection system that allows for the collection of packet metadata in a selective, intelligent, and context-aware manner, and without requiring a separate representation/format for the metadata. Through the use of a packet metadata filter, only the metadata needed by the traffic analysis service is captured, reported, and stored, greatly reducing the resource consumption by the telemetry collection system. In addition, the proposed system can still support existing utilities, such as the packet indexing system, Moloch, and packet analyzers, such as Wireshark, by having the system output selected and truncated packets in the conventional packet formats that they use.

Specifically, according to one or more embodiments of the disclosure as described in detail below, a telemetry exporter in a network establishes a tunnel between the telemetry exporter and a traffic analysis service. The telemetry exporter obtains packet copies of a plurality of packets sent between devices via the network. The telemetry exporter forms a set of traffic telemetry data by discarding at least a portion of one or more of the packet copies (e.g., from each flow or session), based on a filter policy. The telemetry exporter applies compression to the formed set of traffic telemetry data. The telemetry exporter sends, via the tunnel, the compressed set of traffic telemetry data to the traffic analysis service for analysis.

Illustratively, the techniques described herein may be performed by hardware, software, and/or firmware, such as in accordance with the traffic analysis process 248 and telemetry capture process 249, which may include computer executable instructions executed by the processor 220 (or independent processor of interfaces 210) to perform functions relating to the techniques described herein.

Figure 4:
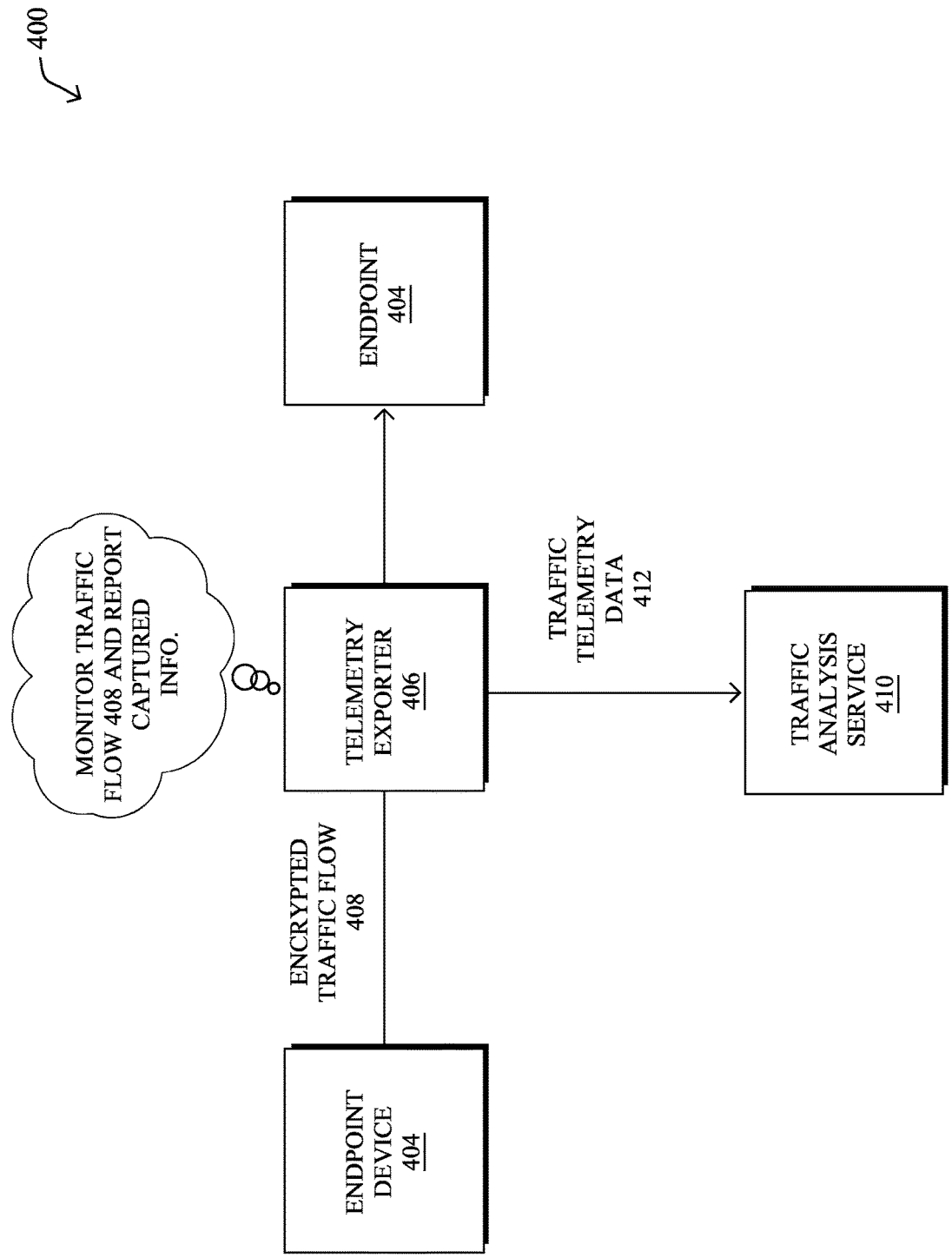
FIG. 4 illustrates an example architecture for the analysis of encrypted traffic in a network.

Operationally, FIG. 4 illustrates an example architecture for the analysis of encrypted traffic in a network, according to various embodiments. As shown in FIG. 4, assume that a network 400 includes an endpoint device 402 in the local network under scrutiny that communicates with another remote endpoint 404. For example, in many cases, endpoint device 402 may be a client device that communicates with a remote server or service via the network. More specifically, endpoint device 402 may form an encrypted traffic session with endpoint 404 and send encrypted traffic flow 408 towards endpoint 404 via the network.

Located along the network path between endpoint device 402 and endpoint 404 may be any number of telemetry exporters, such as telemetry exporter 406. For example, telemetry exporter 406 may be a switch, router, firewall, server, network controller, or other networking equipment via which encrypted traffic flow 408 sent between endpoint device 402 end endpoint 404 flows. During operation, traffic telemetry exporter 406 may capture data regarding encrypted traffic flow 408, generate traffic telemetry data 412 based on the captured data, and send traffic telemetry data 412 to traffic analysis service 410 for assessment. For example, traffic telemetry data 412 may include Internet Protocol Flow Information Export (IPFIX) records and/or Netflow records regarding encrypted traffic flow 408. In further cases, traffic telemetry data 412 may include one or more captured packets from encrypted traffic flow 408, such as the first n-number of data packets of flow 408.

In various embodiments, network 400 may also include a traffic analysis service 410 that is implemented by one or more devices in network 400 through the execution of traffic analysis process 248. For example, in some cases, traffic analysis service 410 may be implemented by one or more devices in the local network of endpoint device 402. However, in further cases, traffic analysis service 410 may be implemented as a cloud service that is in communication with telemetry exporter 406 and endpoint device 402, either directly or indirectly.

During operation, traffic analysis service 410 may make any number of assessments of encrypted traffic flow 408 without actually decrypting the flow. Notably, the characteristics of flow 408 can be used as input to one or more machine learning-based classifiers that are configured to make assessments such as whether flow 408 is malware-related (e.g., is propagating malware or malware commands), is attempting to exfiltrate data from the local network of client device 402, whether encrypted traffic flow 408 is using authorized security parameters (e.g., a particular TLS version, etc.) as part of a crypto audit, or for other determinations.

Based on the assessment of encrypted traffic flow 408 by traffic analysis service 412, traffic analysis service 412 may cause any number of mitigation actions to be performed in network 400. For example, traffic analysis service 412 may block or drop encrypted traffic flow 408. In more extreme cases, traffic analysis service 412 may prevent all future traffic in network 400 associated with endpoint device 402 and/or endpoint 404. In yet another example, traffic analysis service 412 may send a notification to a user interface that is indicative of the assessment of encrypted traffic flow 408 by traffic analysis service 412. For example, traffic analysis service 412 may notify a network administrator, if endpoint device 402 is suspected of being infected with malware.

The large volume of network traffic in a typical network makes it difficult to analyze, especially when such analysis requires storage of telemetry captured over time. Many types of traffic analysis are, fundamentally, classification tasks. For example, traffic analysis service 410 may perform any or all of the following regarding traffic flow 408: protocol identification, application identification, passive operating system fingerprinting, or network intrusion detection via signature matching. Training and validating classifiers requires data sets that comprehensively represent each class, and thus requires extensive data storage. Network forensics also requires traffic to be retained for some time period.

To help reduce the exporting of actual packets from traffic flow 408 to traffic analysis service 410 as part of traffic telemetry data 412, as noted, traffic telemetry data 412 may include IPFIX or Netflow record information, which serves as a summary representation of the traffic. For example, such record information may indicate information such as the source and destination IP addresses, TCP/UDP ports, the start and stop times of each session, protocol information, as well as byte and packet counts. This summary data is quite compact relative to the full packets and is sufficient for some types of traffic analysis.

Unfortunately, many types of traffic analysis require more information than that afforded by IPFIX and Netflow records. For example, passive DNS monitoring, TLS client fingerprinting, and the other classification tasks above all fall within this category. For this reason, a favored approach is to include the first n-number of packets of encrypted traffic flow 408 in the traffic telemetry data 412 exported to traffic analysis service 410.

Figure 5:
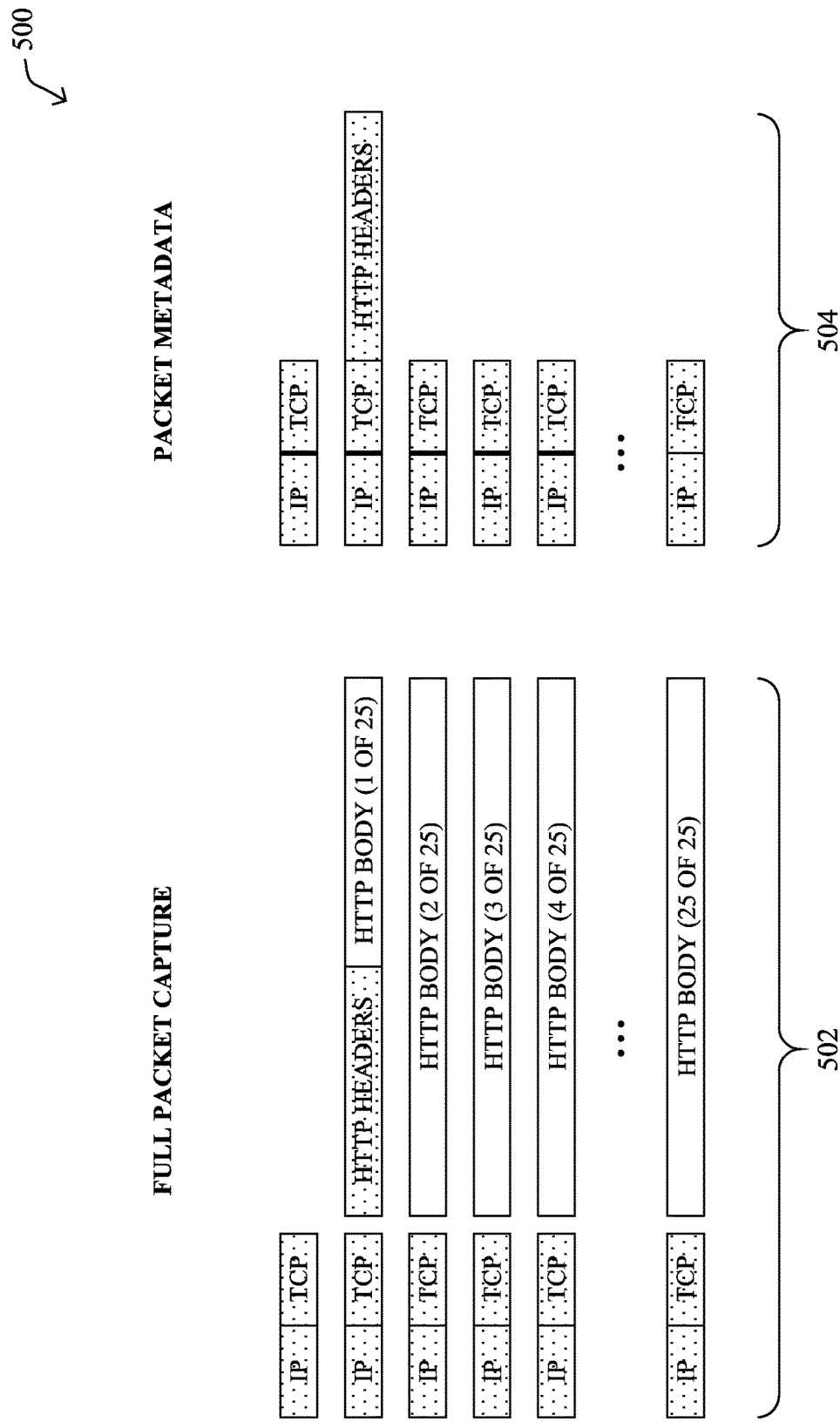
FIG. 5 illustrates an example comparison of the full packets captured by a telemetry exporter to the packet metadata actually needed by a traffic analysis service.

A key observation is that, while the exporting of packet copies to traffic analysis service 410 enables traffic analysis service 410 to perform certain types of traffic classifications, much of the exported packets are largely ignored. For example, FIG. 5 illustrates an example 500 comparing the full packets 502 captured by a telemetry exporter to the packet metadata 504 actually needed by the traffic analysis service. Indeed, network session metadata such as TCP/IP headers, HTTP headers, TLS handshake information, and DNS responses is information-rich and can be useful for traffic analysis purposes such as detecting malware, operating system fingerprinting, application identification, etc. Another important type of metadata for traffic analysis is message information such as message headers and the lengths, types, and arrival times of messages.

According to various embodiments, a packet metadata filtering mechanism is introduced herein that allows for the dynamic filtering of packet metadata for analysis by a traffic analysis service. In some aspects, the filtering mechanism can be executed directly on a traffic telemetry exporter, significantly reducing the amount of telemetry data communicated across the network and resulting in less network resources being consumed. In further aspects, the filtering mechanism may be controllable by the traffic analysis service, allowing the service to control what data features are considered metadata for purposes of telemetry reporting.

Figure 6:
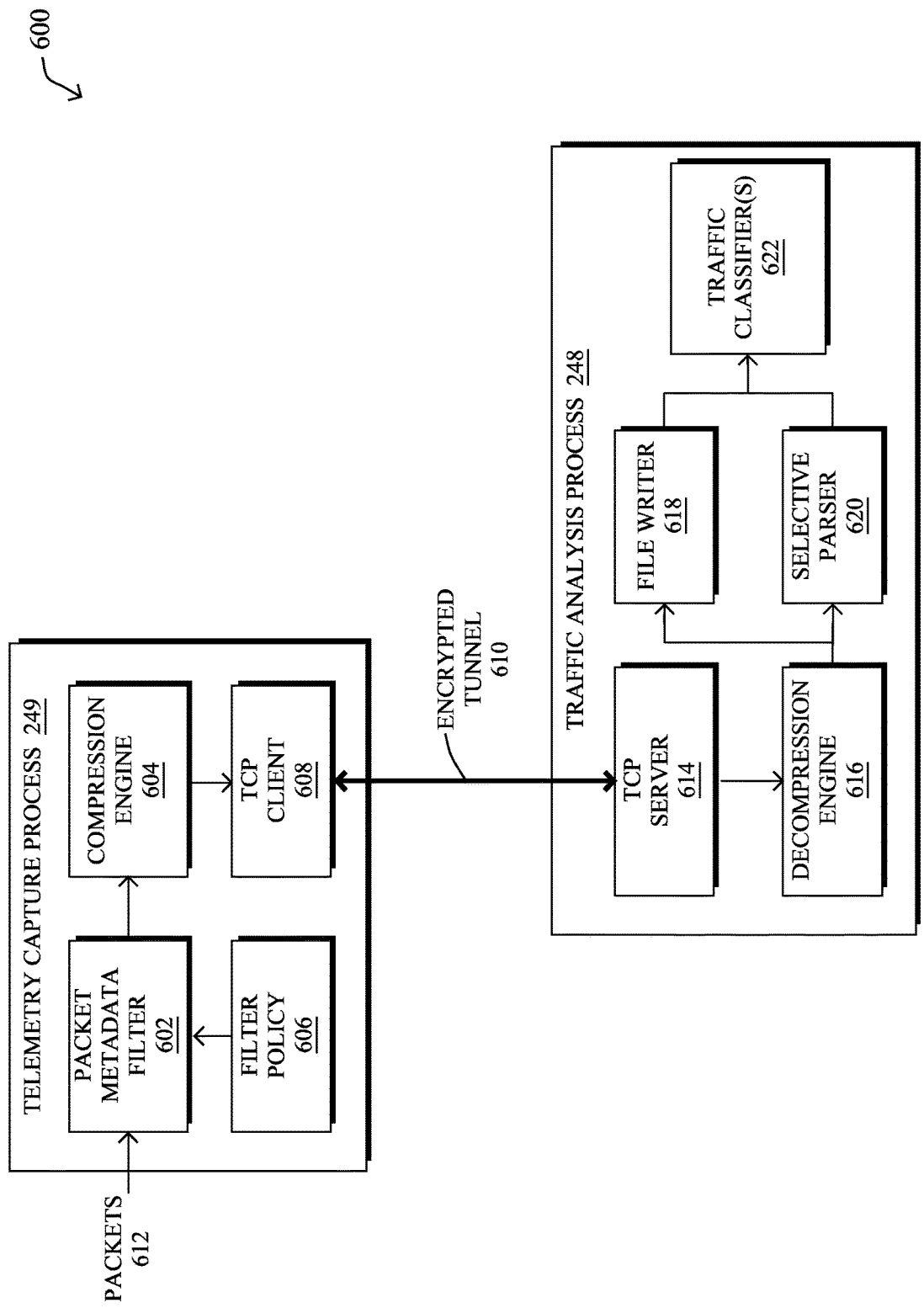
FIG. 6 illustrates an example architecture for exporting telemetry data using a packet metadata filter.

FIG. 6 illustrates an example architecture 600 for exporting telemetry data using a packet metadata filter, according to various embodiments. As shown, architecture 600 may generally include telemetry capture process 249 and traffic analysis process 248 which may be executed by one or more devices. For example, telemetry capture process 249 may be executed by a telemetry exporter in a network, such as a router, switch, dedicated exporter, or the like, while traffic analysis process 248 may be executed by one or more servers in the cloud or a data center. In the distributed case, the devices executing processes 248-249 may be viewed as a single device for purposes of implementing architecture 600. At the core of architecture 600 may be the following components: a packet metadata filter 602, a header compression engine 604, one or more filter policies 606, a TCP client 608, a TCP server 614, a header decompression engine 616, a file writer 618, a selective parser 620, and/or a traffic classifier 622. In further implementations, the functionalities of components 602-608 and 614-622 may be combined or omitted, as desired.

During execution, telemetry capture process 249 may receive traffic packets 612 from one or more traffic flows (e.g., encrypted traffic flow 408 shown in FIG. 4) and apply packet metadata filter 602 to packets 612 according to a corresponding filter policy 606. More specifically, packet metadata filter 602 may function as a truncating filter that, given a packet 612, truncates it to an appropriate length, resulting in a truncated copy of the packet to be exported to traffic analysis process 248 for analysis. If, for example, if a given packet 612 does not include any metadata of interest according to filter policy 606, the truncated packet will be of zero bytes and will not be reported to traffic analysis process 248. Otherwise, the packet 612 will be truncated down to the metadata of interest and provided to traffic analysis process 248.

Since the truncated packets sent to traffic analysis process 248 are much smaller in size than that of fully-captured packets, the overall resources consumed by the telemetry exporting mechanism will be greatly reduced. Indeed, the packet data discarded by packet metadata filter 602 may be much larger in size than the remaining metadata of the packet 612. For example, the data discarded by packet metadata filter 602 from a packet 602 may include sensitive, private information (e.g., the body of an HTTP message) or unintelligible data, such as the ciphertext fields of HTTPS records. In addition, traffic metadata is often less sensitive in nature than the contents of a packet 612, making it easier to be anonymized. When user privacy is a concern, in some embodiments, packet metadata filter 602 may also apply an anonymization technique to the truncated packet, such as by encrypting the address information in the truncated packet.

More formally, assume that a given packet 616 can be represented as a byte string. In such a case, let $P_n$ denote the set of all possible packets with lengths up to n. A packet sequence $p_1, p_2, \ldots, p_1, p_1,p_2, \ldots, p_l \in P_n^l$ represents a unidirectional communication between a sender and one or more receivers, whose identities are excluded from this notation for clarity. When p is a byte string, p[i] denotes its $i^{th}$ byte, wherein the first byte is indexed 0, and p[i:j] denotes the substring of bytes i through j.

Generally, the packet sequences of interest for purposes of traffic classification by traffic analysis process 248 are those sent in a single flow, which are logically associated and all share the same flow key and occur within the same timespan. A function $k:P_n \to K$ maps a packet to an element of the set K of flow keys. For a packet flow $p_1,p_2, \ldots, p_l, k(p_1)=k(p_2)= \ldots k(p_l)$. Informally, the value returned by the key function serves as a label that identifies the flow to which a packet belongs. For conventional TCP/IP, UDP/IP, and ICMP, k is 5-tuple consisting of the IP source and destination addresses, IP protocol number, and TCP/UDP source and destination ports. For non-TCP/UDP protocols, the ports are nil.

Each traffic flow may have a flow record associated with it that stores flow-specific state information. Accordingly, let $r_j$ denote a flow record with key j and R denote the set of possible records. In some embodiments, packet metadata filter 602 may be configured to store state information within such flow records, for purposes of applying filtering to packets 612. Alternatively, packet metadata filter 602 may operate in a stateless manner, in a further embodiment. Further, a given flow record can store the capturing/done state within a single bit. However, it is sometimes desirable to avoid storing even a single bit per flow (e.g., because the amount of available fast memory is insufficient, etc.). To further reduce the amount of state required in stateful filtering by filter 602, while not accidentally discarding metadata, filter 602 could employ the use of a Bloom filter to record when a flow is in a packet 'capturing' state or a 'done' state, in one embodiment. Then, when a flow enters a capturing state, filter 602 may increment the Bloom counter and decrement the counter, when entering the done state.

A filter policy 606 may be formally defined as a function $f:P_n \times R \to \{1,0\}$ that defines which packets of filter. When applying filter policy 606 to a given packet 612, packet metadata filter 602 may effectively apply a truncation function $g:P_n \times R \to \{1, n\}$ that indicates how many bytes of the prefix of the packet are of interest.

In addition, let protocol G represent a probabilistic source of packets 612 with memory. That is, G is determined by the conditional distribution $P_G[p_i|p_1,p_2,\ldots,p_{i-1}]$. If I represents the set of known protocols, a protocol identification function $h_\epsilon:P_n^l \to I^*$ will then indicate that one or more protocols that match a sequence of l-number of packets. This function has the property that $h(p_1,p_2, \ldots, p_l) = G$ for any $p_1,p_2, \ldots, p_l$ where $P_G[p_i|p_1,p_2, \ldots, p_l] \geq \epsilon$. Also implicit to this definition is the fact that multiple protocols may generate the same packet sequence. Therefore, the parameter $\epsilon$ allows filter 602 to ignore ones whose likelihood is low. Note that this formalization neglects the arrival times of the packets and also implicitly assumes that all of the packets 612 are observed within a limited timespan.

For a protocol G, the set of possible metadata elements is denoted M, and the metadata extracting function of packet metadata filter 602 can be formalized as $e_G:p_1,p_2, \ldots, p_l \to M_G$. Pseudocode for the application of the protocol identification function by packet metadata filter 602 is as follows:

Return true if $\Omega < \Omega'$ $G \leftarrow h_e(p_1,p_2, \ldots, p_l)$ return $e_G(p_1,p_2, \ldots, p_l)$ In some embodiments, packet metadata filter 602 may combine truncation functions, to filter packets 612. Formally, for any two truncation functions $g_a, g_b:P_n \times R \to \{0, n\}$, their conjugation can be denoted as $g_a \wedge g_b$ and is defined as $g_c = g_a \wedge g_b$ where $g_c(p) = \max(g_a(p), g_b(p))$. That is, the conjugation of two truncation functions is one that accepts as many bytes of a packet as either of them.

Example filter policies 606 may include, but are not limited to, the following:

TABLE 1

| Name | Metadata Included |
|---|---|
| Minimal TCP | IP + TCP headers (SYN, FIN, RST only) |
| Full TCP | IP + TCP headers (all) |
| TCP Initial Message | TCP data before ACK advance, in each direction |
| Minimal [D]TLS | Handshake records |
| Full [D]TLS | Handshake records, all record types and lengths |
| HTTP | Version, command, headers, magic |

TABLE 1-continued

| Name | Metadata Included |
|---|---|
| UDP | IP + UDP headers |
| DNS | IP + UDP headers, DNS responses |

In various embodiments, packet metadata filter 602 can be configured to send different types of packet metadata to traffic analysis process 248 by specifying one or more filter policies 606 to telemetry capture process 249 that should be applied to packets 612. For example, traffic analysis process 248 may request that packet metadata filter 602 send Minimal TCP and DNS metadata to process 248 for analysis.

From Table 1 above, the HTTP metadata filter policy may require the HTTP command, protocol, and headers from heat request, as well as the 'magic' first several bytes of the body and similar data for each response. The DNS metadata filter policy may require the entirety of each DNS response packet and none of the request packets. For the [D]TLS policies, minimal and full policies are defined. Under the minimal policy, packet metadata filter 602 may capture only the ContentType values of packets 612 of the handshake, which includes clientHello, serverHello, and clientKeyExchange values, as well as change_cipher_spec, and alert values. The full [D]TLS policy may include the ContentType, Protocol Version, and length fields from each TLSCiphertext record that appears at the beginning of a TCP Data filed. Those TLS fields comprise the first five bytes of the record. Note that a single TLS record may span multiple TCP packets 612, or multiple records may appear in a single packet. In general, TLS records are not guaranteed to appear at the start of a TCP Data field, meaning that packet metadata filter 602 may parse all of the records by moving forward as per the length field of the previous record. The TLS policies may similarly be divided into full and minimal policies whereby the full policy requires the TCP/IP headers from each packet, including IP and TCP options, while the minimal TLS policy may require that data only for the packet 612 for which the SYN, FIN, and RST flags are set.

The TCP initial message policy may cause packet metadata filter 602 to capture all packets 612 in the client-to-server direction that contain one or more bytes of the initial application message, and the equivalent server-to-client packets. Packet metadata filter 602 may identify such packets 612 based on the assumption that when a TCP-based application protocol is used synchronously, all of the TCP packets in the same direction share the same Acknowledgement number as part of the same application message. Pseudocode for application of the TCP initial message policy by packet metadata filter 602 is as follows, in one embodiment:

```
if the packet is the first in a flow then
    set S and A to nil
endif
if p.SYN = 1 then
    S ← p.S
    return #p
endif
if p.ACK = 1 then
    A ← p.A
endif
if p.ACK = 0 and (A=nil or p.A = A) then
    return #p
endif
if p.S > S and p.A = A then
    return #p
endif
return 0
```

More specifically, a TCP initial message filter policy 606 may cause telemetry capture process 249 to capture, for each TCP session between endpoints, the initial message in each direction. As a result, telemetry capture process 249 may capture all of the data for messages that extend over multiple TCP/IP packets. This is particularly important for purposes of analyzing traffic that uses TLS or HTTP, but can also be useful for the analysis of traffic that uses unknown protocols, as well. In the case of TLS, for example, the most important initial message for purposes of analysis is the TLS serverHello/serverCertificate.

In various embodiments, packet metadata filter 602 may implement either or both of the following, to enforce a TCP initial message filter policy 606:
  A Boolean filter—this filter may simply control whether telemetry capture process 249 captures or does not capture a particular packet 612 as it appears on the wire, without altering it in any way.
  A reconstruction filter—in this case, packet metadata filter 602 may merge together the data segments of all of the TCP/IP packets spanned by the initial message, creating a single TCP/IP packet that represents what the endpoint would have sent if it hadn't needed to fragment the packet.

Generally speaking, a Boolean filter may be simpler and perform better, while a reconstruction filter provides more functionality. In one embodiment, if the Boolean filter is confused due to packet loss, retransmissions, etc., it may default to a 'fail open' mode whereby it gathers all initial packets, even if doing so means capturing spurious packets, as well.

As would be appreciated, in a synchronous TCP connection, the server listens while the client talks, and vice-versa. When a client talks, it sends TCP packets with incrementing Sequence Number (Seq) fields, and the server sends TCP packets with incrementing Acknowledgement Number (Ack) fields (and unchanging sequence numbers and zero-length data fields) to indicate that it heard the message. Server-to-client Seq and Ack values are mirror images of the client-to-server Seq and Ack values. In other words, to acknowledge receipt of a packet with Seq=S, a packet with Ack=S is sent. The SYN flag is considered to logically take up one byte of the TCP data stream. Typical TCP behavior is to use a 'relative sequence number' in which the Seq and Ack that have their initial values subtracted out.

A TCP message is defined as the set of TCP/IP packets for which the ACK flag is set, the Ack value is constant, and the Seq is incrementing. In the TCP initial message, the relative Ack of the first packet is equal to 1, or the relative Seq of the first packet is equal to 1, or both. In a typical session, the client's initial message has both the relative Seq and Ack of the first packet equal to one, and the server's initial message has only the Seq equal to 1.

To identify the initial message from the server, telemetry capture process 249 may simply look at the relative sequence number of a packet 612. If the relative sequence number is '1,' then telemetry capture process 249 may opt to capture that packet. Similarly, telemetry capture process 249 may also identify subsequent packets of the initial server message based on their acknowledgement numbers matching that of the first message packet from the server. The following illustrates an example TCP session, omitting the TCP handshake:

TABLE 2

| Src | Dst | Seq | Ack | Len | Notes |
|---|---|---|---|---|---|
| 42708 | 443 | 1 | 1 | 313 | client initial message (1 of 1) |
| 443 | 42708 | 1 | 313 | 0 | |
| 443 | 42708 | 1 | 313 | 1460 | server initial message (1 of 3) |
| 42708 | 443 | 314 | 1460 | 0 | |
| 443 | 42708 | 1461 | 313 | 1036 | server initial message (2 of 3) |
| 42708 | 443 | 314 | 2496 | 0 | |
| 443 | 42708 | 2497 | 313 | 793 | server initial message (3 of 3) |
| 42708 | 443 | 314 | 3289 | 0 | |
| 42708 | 443 | 314 | 3289 | 126 | |

The Seq and Ack fields use arithmetic modulo $2^{32}$. Thus, the following preprocessor definitions can be used to compare those fields, in some embodiments:

define LT(X, Y)((int)((X)−(Y))<0)

define LEQ(X, Y)((int)((X)−(Y))<=0)

define GT(X, Y)((int)((X)−(Y))>0)

define GEQ(X, Y)((int)((X)−(Y))>=0)

A retransmitted TCP packet can be ignored by telemetry capture process 249, if its data field has the same length as the previous packet, but it is important to check for that. In addition, a TCP packet containing a retransmission of a previous segment could also contain additional data, which may also be checked.

In one embodiment, a Boolean filter for packet metadata filter 602 can be implemented by tracking the Seq and Ack numbers for each active traffic flow. This will require a large hash table, which is indexed using a hash of the flow key. It may be useful to have a hash function definition that is symmetric in how it handles addresses and ports, so that both the client-to-server and server-to-client flow keys hash to the same data structure. Doing so could minimize storage and help to reduce computation. In addition, each worker thread may maintain its own flow table, to avoid read/write contention.

In further embodiments, packet metadata filter 602 may implement a filter policy 606 in a protocol-aware manner. More specifically, filter 602 may identify the initial messages of protocols of interest (e.g., TLS, HTTP) and parse enough of the packets to determine whether they are complete or not. Such a mechanism is referred to herein as a 'completion test,' and can be implemented with relatively minimal packet parsing. For TLS packets 612, this requires only understanding the TLS Record type and length fields, and for HTTP packets 612, involves only scanning for the 0x0D0A0D0A four-byte sequence. For example, a protocol-aware filter 602 can identify a TCP packet containing a TLS serverHello and serverCertificate message, test to see whether it is complete, and if not, then filter 602 can create a flow-table entry that indicates that additional packets 612 in the flow are needed. The flow table is checked to see if additional packets 612 are needed in a given flow, and those packets are checked to see if they complete the TCP message. If they do, then the flow-table entry is deleted by filter 602.

Generally speaking, a protocol-aware filter might offer better performance and scalability, as compared with a protocol-agnostic approach that only looks at TCP headers, because its flow table is much smaller. In addition, the flow table will include an entry for a flow only during the handshake and only if the initial message was not in a single packet. The latency of looking up a flow-table entry for each packet is the dominating cost for many packet-processing systems, so it would be a big performance boost to fit the entire flow table into the memory cache. In a further embodiment, a reconstructing filter used by packet metadata filter 602 could also benefit from being protocol-aware because it needs to understand when to buffer the first TCP packet 612 with data in it (e.g., by using a completion test or the like).

Truncation of a copy of a packet 612 by packet metadata filter 602 generally requires that filter 602 have enough awareness about the protocol(s) in its applied filter policy 606 to be able to identify the start of each new session. To do so, in various embodiments, packet metadata filter 602 may attempt to match a given packet 612 against a pattern using a rooted keyword tree, with each node of the tree being associated with a single byte of one or more keywords. This approach minimizes the number of operations that filter 602 needs to perform for the match. In another embodiment, filter 602 may employ a multiple string-matching implementation, for protocol identification. In yet another embodiment, filter 602 may employ a 'mask and match' scheme to test the equality of substrings that appear in the first x-number of bytes of a payload (e.g., first 8 or 16 bytes). Example strings that filter 602 may employ for protocol identification may include, but are not limited to, any or all of the following:

TABLE 3

| Protocol | Direction | Hex String | Notes |
|---|---|---|---|
| TLS (443) | C | 160301****01 | ClientHello v1.0 |
| | | 160302****01 | ClientHello v1.1 |
| | | 160303****01 | ClientHello v1.2 |
| | | 160301****02 | ClientHello v1.0 |
| | | 160302****02 | ClientHello v1.1 |
| | | 160303****02 | ClientHello v1.2 |
| HTTP (80) | C | 47455426 | 'GET' |
| | | 504f535420 | 'POST' |
| | | 4f5054494f4e5320 | 'OPTIONS' |
| | | 4845414420 | 'HEAD' |
| | | 50555420 | 'PUT' |
| | | 44454c45544520 | 'DELETE' |
| | | 545241434520 | 'TRACE' |
| | | 434f4e4e45435420 | 'CONNECT' |
| | S | 485454502f312e3120 | HTTP/1.1' |
| SSH (22) | — | 5353482d322e302d | 'SSH-2.0' |
| DNS (53) | C | ****010000010000 | Query |
| DNS (53) | S | ****818000010000 | Response |
| DHCP (67) | C | 01010600 | REQUEST |
| DHCP (68) | S | 02010600 | REPLY |

The start of a new TCP flow can be recognized by packet metadata filter 602 by the SYN flag in the handshake. When a TCP SYN or SYN/ACK packet 612 is observed, packet metadata filter 602 may create a new flow record and record the (initial) sequence number. When a non-SYN packet 612 is observed, filter 602 may process the TCP payload as follows. First, filter 602 may apply protocol identification to the packet 612. If the protocol is TLS, then filter 602 may parse the packet 612 as a stream of records. If the length of the record exceeds that of the packet 612, filter 602 may store the next sequence (NextSEQ) at which record-parsing should resume. Filter 602 may then keep a record of the highest TCP sequence number that has been processed (accepted) so far. If a TCP packet 612 then arrives with a lower sequence number, packet metadata filter 602 may copy that packet in its entirety.

Stateless filtering by packet metadata filter 602 can also be implemented by copying the entire packet, if the initial 16-byte prefix of the TCP payload is in the following 97-character character-set that can appear in HTTP headers of packets 612:

, !, ", #, $, %, &, ', (,), *, +,, -, ., /, 1, 0, 1, 2, 3, 4, 5, 6, 7, 8, 9, :, ;, <, =, >, ?, @, A, B, C, D, E, F, G, H, I, J, K, L, M, N, O, P, Q, R, S, T, U, V, W, X, Y, Z, [,], ^, _, ', a, b, c, d, e, f, g, h, i, j, k, 1, m, n, o, p, q, r, s, t, u, v, w, x, y, z, {, |, }, ~, or if that prefix consists of HTTPS characters up to the pattern CRLFCRLF. Otherwise, filter 602 may truncate the packet 612. Because most HTTP 1.1 traffic uses a compressed encoding, this will capture all of the HTTP headers, while discarding almost all traffic with a compressed encoding (e.g., a 16-byte prefix). HTTP text encoding, however, will be copied by filter 602 instead of being copied. Filter 602 can also implement a stateless filter for TLS traffic using a simple rule: copy only packets other than those whose TCP or UDP data fields start with the pattern 17030, which indicates TLS data records. A similar pattern can be used by filter 602 to match SSL, as well.

Note that there are two ways in which packet metadata filter 602 may fail, when presented with a given packet 612 containing 1≥0 bytes of metadata. In a first case, filter 602 could return m>1 bytes, in which case p[m−1:m] is the residual data. In a second case, it could return m such that 0≤m≤1, in which case p[m:1] is referred to herein as lost data. The efficiency of the truncation by packet metadata filter 602 can then be quantified in terms of the expected number of bytes of residual data and its failure rate by the expected number of bytes of lost data with respect to a particular traffic distribution.

In one embodiment, an output of packet metadata filter 602 may be a packet capture (PCAP) file that includes the metadata specified by a filter policy 606 and a minimum of other data. Such a PCAP file may store the sequence of packets 612 processed by filter 602, which may have been truncated during processing, each of which may be associated with a timestamp and an indication of the number of bytes in the packet and how many bytes were actually captured and copied by packet metadata filter 602.

In another embodiment, the output of packet metadata filter 602 can be flow-organized such that a stream of packets 612 from multiple flows are captured and then multiplexed into multiple streams of packets, each containing packets from a single flow. To do so, filter 602 may apply its filtering to a flow-organized capture, or by reversing those steps. When the filter policy 606 includes the network or transport headers for many packets, filter 602 may also apply header compression to the packets in each packet flow. Alternatively, filter 602 may apply a compression algorithm, such as DEFLATE, to all of the packet data in the packet flow, which is likely to compress the headers, decently.

As noted above, telemetry capture process 249 may also include a compression engine 604 that compresses the outputs of packet metadata filter 602. For example, in one embodiment, compression engine 604 may apply header compression to the outputs of packet metadata filter 602 and/or by compressing the entire output, such as by forming a .gz file, .zip file, or the like.

In various embodiments, telemetry capture process 249 may also include a TCP client 608 that communicates with a corresponding TCP server 614 of traffic analysis process 248. As shown, TCP client 608 and TCP server 614 may establish and communicate via an encrypted tunnel 610, to protect the telemetry data captured by telemetry capture process 249 from being intercepted by malicious third parties. To further protect the telemetry data, as noted previously, telemetry capture process 249 may also anonymize the telemetry data, prior to sending the telemetry data to traffic analysis process 248.

Decompression engine 616 of traffic analysis process 248 may decompress the traffic telemetry data received by TCP server 614 from telemetry capture process 249. More specifically, decompression engine 616 may apply the decompression algorithm(s) that correspond to the compression algorithm(s) applied to the telemetry data by compression engine 604.

As shown, traffic analysis process 248 may also include a file writer 618 that writes the traffic telemetry data decompressed by decompression engine 616 to persistent storage. Doing so allows traffic analysis process 248 to perform more long-term network traffic analysis, such as network forensics, retrospective analysis, traffic forecasting, and the like.

Traffic analysis process 248 may further include a selective parser 620 that selectively parses the decompressed traffic telemetry data into the various fields or headers of interest. For example, if the telemetry data includes a truncated packet with its IP and TCP headers, selective parser 620 may parse these headers for the features/values that are to be used as input to traffic classifier 622.

In various embodiments, traffic analysis process 248 may execute one or more traffic classifiers 622, to assess the metadata-filtered traffic telemetry data from telemetry capture process 249. For example, a traffic classifier 622 may be a machine learning-based classifier that has been trained to distinguish between benign and malware-related traffic flows, even if that traffic is encrypted. Indeed, by assessing the characteristics of the traffic, such as the unencrypted metadata in the headers of the packets, traffic classifier 622 can match the traffic to that of specific forms of malware on which traffic classifier 622 was trained. Further forms of traffic classification by traffic classifier 622, as noted previously, could also entail identifying the operating system, application, and/or protocol associated with the traffic, fingerprinting the client device or user of the device, etc.

Note that a key aspect of the packet metadata filtering techniques introduced herein is that traffic analysis process 248 can dynamically add, modify, or delete a filter policy 606 (e.g., by sending an instruction to telemetry capture process 249), in various embodiments. This allows for the collection of telemetry data that is tailored specifically to the needs of the traffic classifier(s) 622, while avoiding having to export copies of the entire packets. In addition, this allows process 248 to instruct process 249 to support the capture of new data and protocol formats over time, as well as to capture new feature data for analysis.

Figure 7:
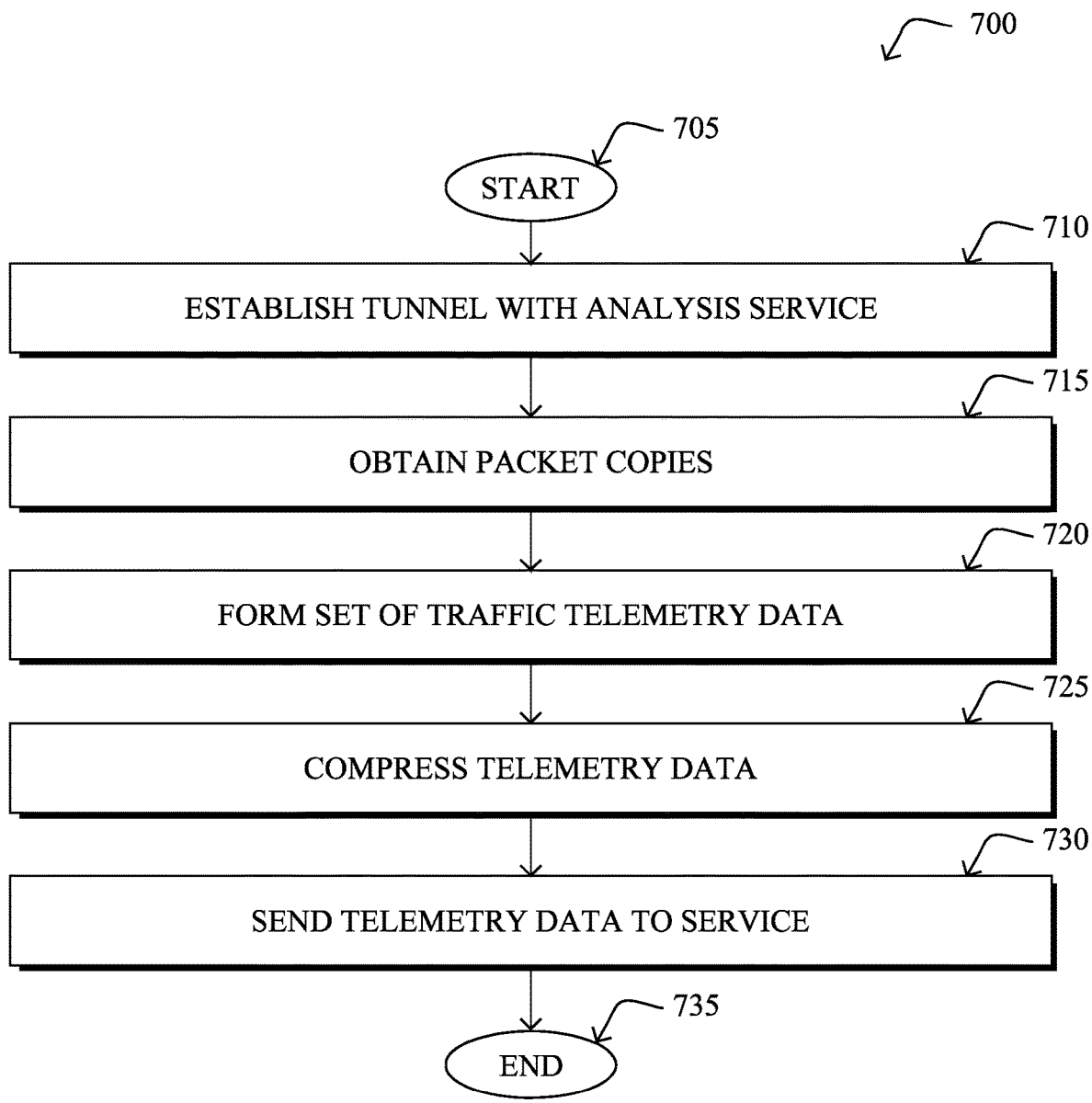
FIG. 7 illustrates an example simplified procedure for sending traffic telemetry data to a traffic analysis service.

FIG. 7 illustrates an example simplified procedure for sending traffic telemetry data to a traffic analysis service, in accordance with one or more embodiments described herein. For example, a non-generic, specifically configured device (e.g., device 200) may perform procedure 700 by executing stored instructions (e.g., telemetry capture process 249), such as a telemetry exporter in the network (e.g., a router, a switch, a specialized telemetry exporter, etc.). The procedure 700 may start at step 705, and continues to step 710, where, as described in greater detail above, the telemetry exporter may establish a tunnel between the telemetry exporter and a traffic analysis service. Such a service may be located within the same network as that of the telemetry exporter or remotely, such as in a data center or the cloud.

At step 715, as detailed above, the telemetry exporter may obtain packet copies of a plurality of packets sent between devices via the network. For example, the plurality of packets may be sent through the network via the telemetry exporter, which captures the packet copies in the fly. In other cases, the telemetry exporter may receive the packet copies from a networking device through which the plurality of packets flow.

At step 720, the telemetry exporter may form a set of traffic telemetry data by discarding at least a portion of one or more of the packet copies, based on a filter policy, as described in greater detail above. In various embodiments, the exporter may do so by discarding the payload of at least one of the packets, in accordance with the filter policy. In general, the filter policy may specify which headers of the packet copies should be included in the traffic telemetry data to be sent to the traffic analysis service. For example, the policy may specify that the TLS handshake records should be included, the DNS responses should be included, or the initial TCP packets included in the telemetry data.

At step 725, as detailed above, the telemetry exporter may apply compression to the formed set of traffic telemetry data. In some cases, this may entail applying header compression to the packet headers in the set of traffic telemetry data. In further cases, this may also entail compressing the entire set of telemetry data.

At step 730, the telemetry exporter may send, via the tunnel, the compressed set of traffic telemetry data to the traffic analysis service for analysis. In some embodiments, the packet copies included in the telemetry data may be encrypted packets and the traffic analysis service may apply a machine learning-based classifier to the set of traffic telemetry data such that the payloads of the packets are not decrypted during the traffic analysis process. Procedure 700 then ends at step 735.

It should be noted that while certain steps within procedures 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms that allow for the control over which traffic telemetry data is reported to a traffic analysis service. By tailoring the reported telemetry data to the metadata actually used by the analysis service, the amount of resources for the telemetry capture and reporting can be greatly reduced.

While there have been shown and described illustrative embodiments that provide packet metadata filtering, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   establishing, by a telemetry exporter in a network, a tunnel between the telemetry exporter and a traffic analysis service;
   obtaining, by the telemetry exporter, packet copies of a plurality of packets sent between devices via the network;
   forming, by the telemetry exporter, a set of traffic telemetry data by discarding at least a portion of one or more of the packet copies, based on a filter policy that specifies one or more packet headers of the packet copies to be included in the set of traffic telemetry data;
   applying, by the telemetry exporter, compression to the formed set of traffic telemetry data; and
   sending, by the telemetry exporter and via the tunnel, the compressed set of traffic telemetry data to the traffic analysis service for analysis.

2. The method as in claim 1, wherein the plurality of packets are encrypted, and wherein the traffic analysis service uses a machine learning-based classifier to classify the set of traffic telemetry data.

3. The method as in claim 1, wherein the discarded portion of the one or more packet copies comprises a payload of that packet copy.

4. The method as in claim 1, wherein the filter policy further specifies that Transport Layer Security (TLS) handshake records in the packet copies should be included in the set of traffic telemetry data.

5. The method as in claim 1, wherein the filter policy further specifies that Domain Name System (DNS) responses in the packet copies should be included in the set of traffic telemetry data.

6. The method as in claim 1, wherein applying compression to the formed set of traffic telemetry data comprises:
   applying header compression to headers of the packet copies in the formed set of traffic telemetry data.

7. The method as in claim 1, wherein the filter policy further specifies that packet copies of initial Transmission Control Protocol (TCP) packets from the plurality of packets that were sent prior to an acknowledgement should be included in the set of traffic telemetry data.

8. The method as in claim 1, further comprising:
   dynamically adjusting, by the telemetry exporter, the filter policy, based on an instruction received from the traffic analysis service.

9. An apparatus, comprising:
   one or more network interfaces to communicate with a network;
   a processor coupled to the network interfaces and configured to execute one or more processes; and
   a memory configured to store a process executable by the processor, the process when executed configured to:
     establish a tunnel between the telemetry exporter and a traffic analysis service;
     obtain packet copies of a plurality of packets sent between devices via the network;

form a set of traffic telemetry data by discarding at least a portion of one or more of the packet copies, based on a filter policy that specifies one or more packet headers of the packet copies to be included in the set of traffic telemetry data;

apply compression to the formed set of traffic telemetry data; and send, via the tunnel, the compressed set of traffic telemetry data to the traffic analysis service for analysis.

10. The apparatus as in claim 9, wherein the plurality of packets are encrypted, and wherein the traffic analysis service uses a machine learning-based classifier to classify the set of traffic telemetry data.

11. The apparatus as in claim 9, wherein the discarded portion of the one or more packet copies comprises a payload of that packet copy.

12. The apparatus as in claim 9, wherein the filter policy further specifies that Transport Layer Security (TLS) handshake records in the packet copies should be included in the set of traffic telemetry data.

13. The apparatus as in claim 9, wherein the filter policy further specifies that Domain Name System (DNS) responses in the packet copies should be included in the set of traffic telemetry data.

14. The apparatus as in claim 9, wherein the apparatus applies compression to the formed set of traffic telemetry data by:

applying header compression to headers of the packet copies in the formed set of traffic telemetry data.

15. The apparatus as in claim 9, wherein the filter policy further specifies that packet copies of initial Transmission Control Protocol (TCP) packets from the plurality of packets that were sent prior to an acknowledgement should be included in the set of traffic telemetry data.

16. The apparatus as in claim 9, wherein the process when executed is further configured to:

dynamically adjust the filter policy, based on an instruction received from the traffic analysis service.

17. The method as in claim 9, wherein the apparatus comprises a network switch or router.

18. A tangible, non-transitory, computer-readable medium storing program instructions that cause a telemetry exporter in a network to execute a process comprising:

establishing, by the telemetry exporter, a tunnel between the telemetry exporter and a traffic analysis service;

obtaining, by the telemetry exporter, packet copies of a plurality of packets sent between devices via the network;

forming, by the telemetry exporter, a set of traffic telemetry data by discarding at least a portion of one or more of the packet copies, based on a filter policy that specifies one or more packet headers of the packet copies to be included in the set of traffic telemetry data;

applying, by the telemetry exporter, compression to the formed set of traffic telemetry data; and sending, by the telemetry exporter and via the tunnel, the compressed set of traffic telemetry data to the traffic analysis service for analysis.

\* \* \* \* \*